United States Patent [19]
Johnston

[11] 4,347,668
[45] Sep. 7, 1982

[54] DEVICES FOR USE IN ALIGNING AXLES
[76] Inventor: Harry R. Johnston, R.D. #4 - Box 250-G, Coatesville, Pa. 19320
[21] Appl. No.: 890,588
[22] Filed: Mar. 20, 1978
[51] Int. Cl.³ .................................................. G01B 5/25
[52] U.S. Cl. ........................................ 33/193; 33/1 N
[58] Field of Search ............... 33/1 N, 1 PT, 180 AT, 33/181 AT, 193

[56] References Cited
U.S. PATENT DOCUMENTS

| | | | |
|---|---|---|---|
| 2,590,722 | 3/1952 | Otis | 33/193 |
| 2,640,274 | 6/1953 | Crosby | 33/174 P |
| 2,845,718 | 8/1958 | Keymer | 33/193 |
| 3,137,076 | 6/1964 | Hurst | 33/193 |
| 3,248,794 | 5/1966 | Corry | 33/193 |
| 3,611,575 | 10/1971 | Chartier | 33/193 |

Primary Examiner—Richard R. Stearns
Attorney, Agent, or Firm—Howson and Howson

[57] ABSTRACT

Compact and portable apparatus particularly useful in aligning the axles of trailers comprises an instrument case connected by an elongated spring-loaded cable to the trailer kingpin and connected by a pair of cables to clips releasably fastened at spaced locations to the trailer axle. The case contains a sector gear which is connected to the kingpin cable and which meshes with a pinion gear coupled to a pointer adapted to register with an array of graduations to provide a readout of the misalignment which is readily readable by a workman stationed at the location adjacent the trailer axle adjustment mechanism. If desired, the case may include a lamp which is connected to a self-contained power supply and which is illuminated when the axle is properly aligned with respect to the trailer frame. In one modified embodiment, a potentiometer is coupled to the input lever and is operable to provide an analog signal corresponding to the misalignment of the axle. The analog signal is processed in a circuit carried in the case to provide a readout of the angular disposition of the axle with respect to the trailer frame. In another modified embodiment, the apparatus is designed so that the casing can be mounted by a bracket to pre-drilled holes in the axle and the pointer read from the front of the axle.

2 Claims, 10 Drawing Figures

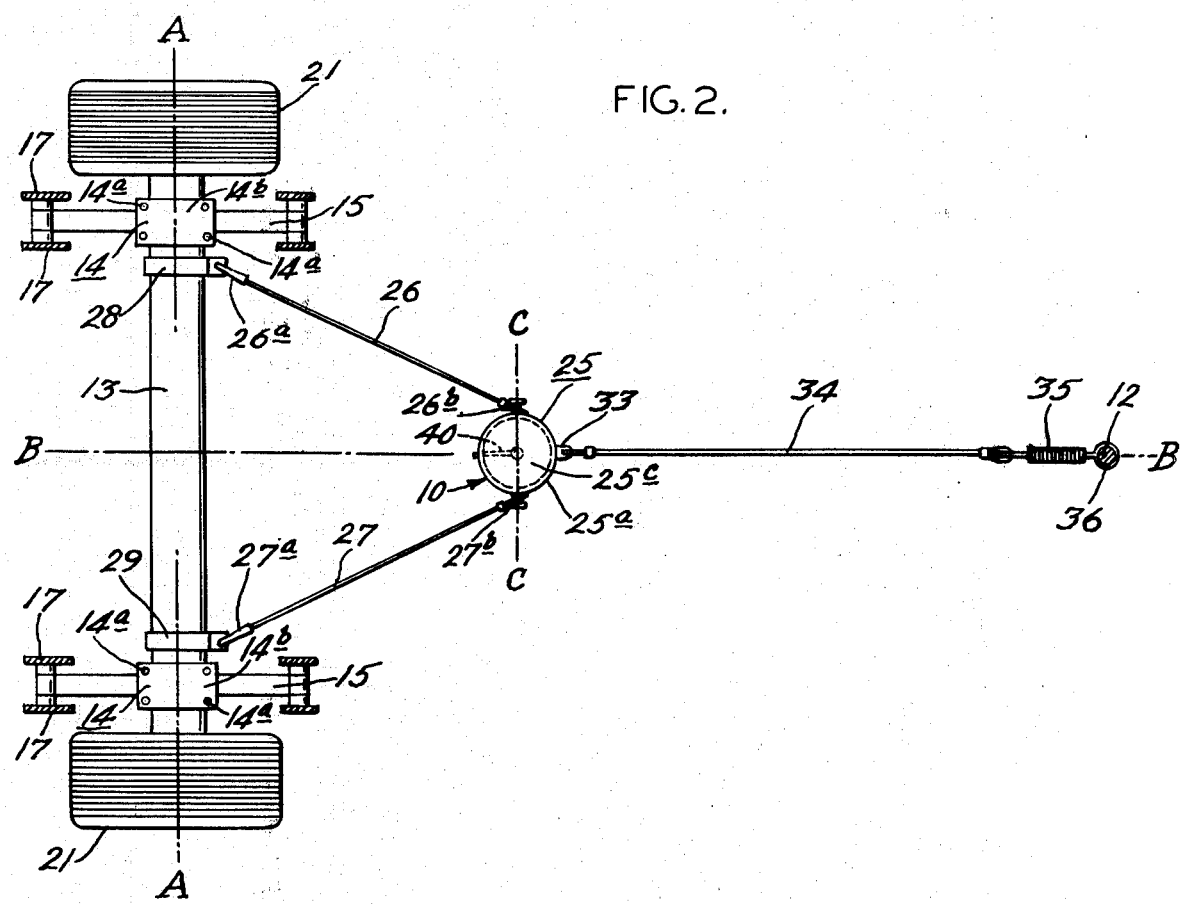

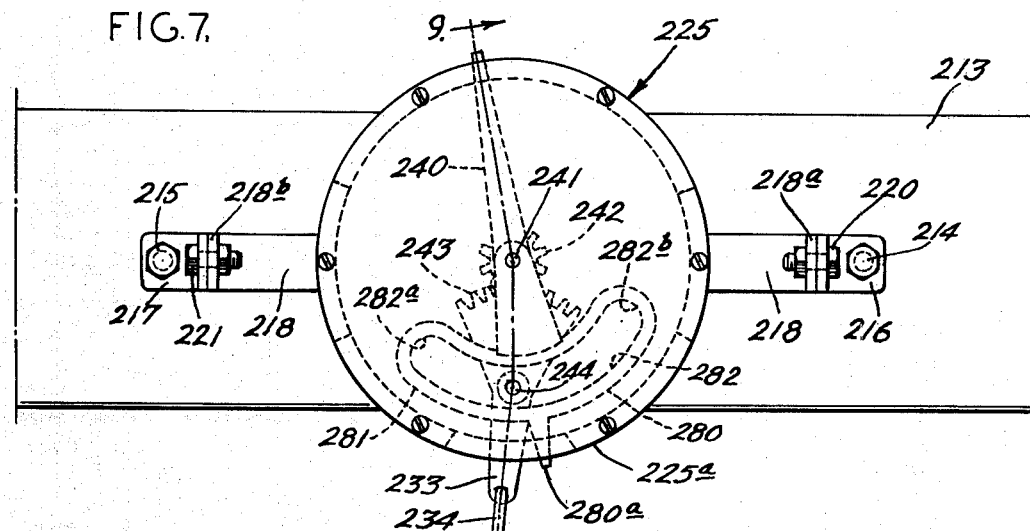
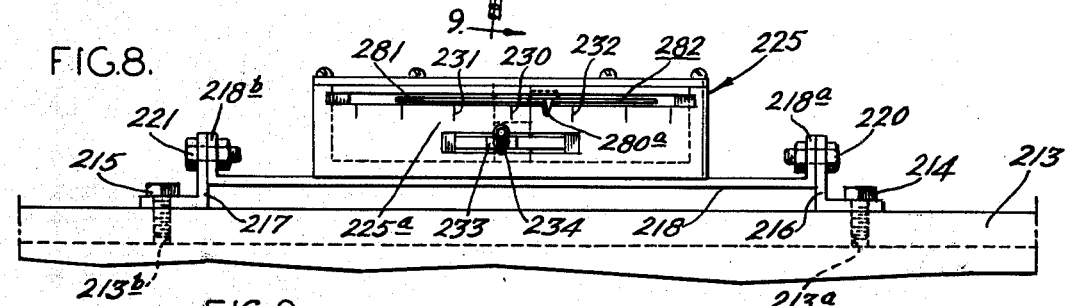
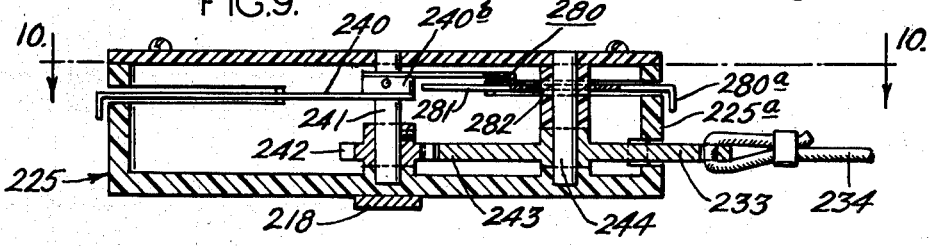
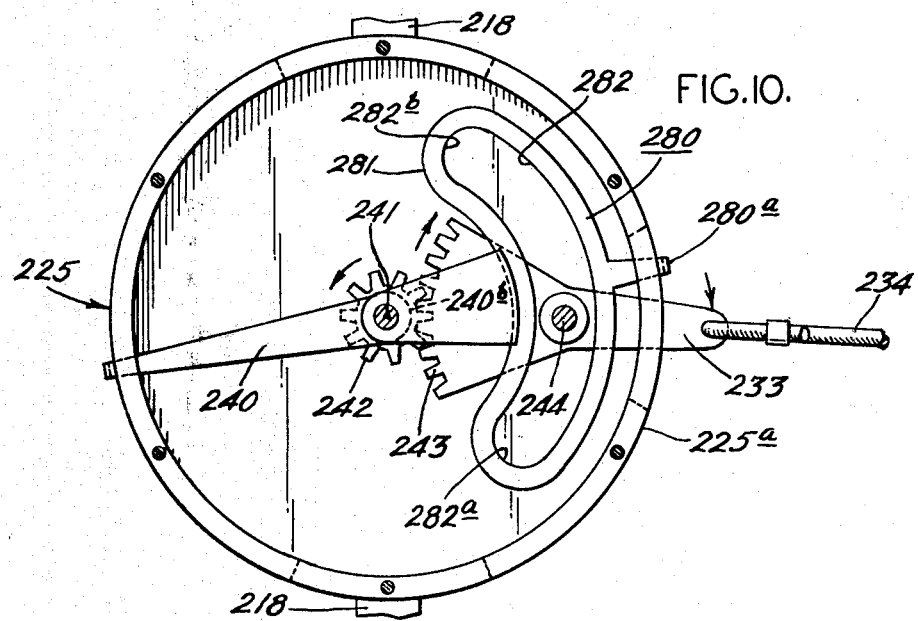

DEVICES FOR USE IN ALIGNING AXLES

The present invention relates to axle alignment apparatus, and more particularly, the present invention relates to apparatus for use in aligning trailer axles.

Various types of devices used to align trailer axles are known. One such device is disclosed in U.S. Pat. No. 3,137,076 issued to C. L. Hurst. The device illustrated in FIGS. 18 and 19 of the Hurst patent includes a frame which is fastened to the front one of a pair of trailer axles and which pivotably mounts a pointer adapted to indicate the misalignment of the axle with respect to the trailer frame. One end of the pointer is fastened through a spring loaded cable to the kingpin of the trailer, and the other end of the pointer registers with graduations on an arcuate scale carried by the frame to provide an indication of the amount of misalignment of the axle.

While the Hurst apparatus may function satisfactorily for its intended purpose, the thrust of the present invention is to provide a relatively simple and compact device which enables a mechanic accurately to align trailer axles with a minimum of wasted effort.

With the foregoing in mind, a primary object of the present invention is to provide a novel device for use in accurately aligning axles.

Another object of the present invention is to provide an improved device for use in aligning trailer axles in an efficient manner.

A further object of the present invention is to provide a relatively inexpensive yet accurate axle alignment device which enables a mechanic quickly to align a trailer axle by eliminating the necessity for his moving back and forth between an axle adjustment location and an alignment indicating location.

As another object, the present invention provides a compact, accurate and inexpensive axle alignment checking device which is, therefore, particularly useful by the operators of small fleets of trailer trucks.

In summary, a more specific object of the present invention is to provide apparatus for use in aligning the axle of a vehicle with respect to its frame. The apparatus comprises a case connected to the axle and means mounted in the case to rotate in response to pivotal movement of an input lever connected to a reference datum on the frame of the vehicle to provide an amplified readout of axle alignment so that a relatively small angular displacement of the input lever, as determined by the alignment of the axle with respect to the reference datum on the frame, is amplified to afford accurate alignment of the vehicle axle.

These and other objects, features and advantages of the present invention should become apparent from the following description when taken in conjunction with the accompanying drawings in which:

FIG. 1 is a fragmentary longitudinal sectional view of a trailer mounting axle alignment apparatus embodying the present invention;

FIG. 2 is a sectional view taken on line 2—2 of FIG. 1;

FIG. 3 is an enlarged view of the rear of the alignment indicator case;

FIG. 7 is a plan view illustrating another modified embodiment of the present invention;

FIG. 8 is an elevational view of the modified embodiment illustrated in FIG. 7 looking rearward toward the axle;

FIG. 9 is an enlarged sectional view taken on line 9—9 of FIG. 7; and

FIG. 10 is a sectional view taken on line 10—10 of FIG. 9.

Figure 4:
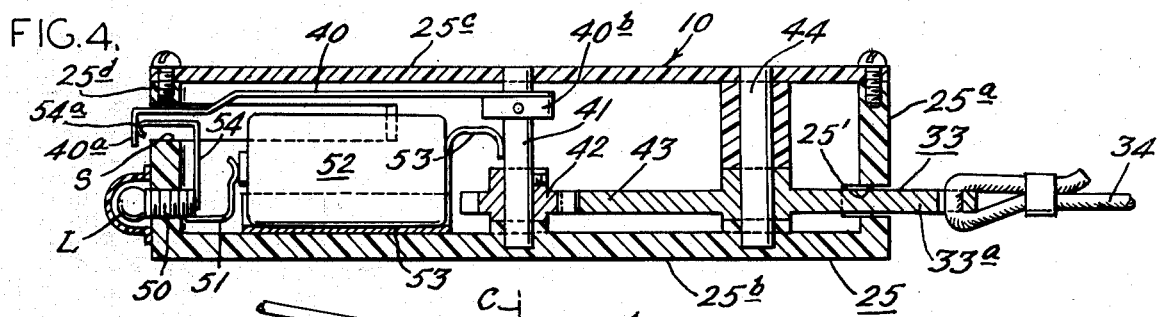
FIG. 4 is a sectional view taken on lines 4—4 of FIG. 3.

Referring now to the drawings, FIG. 1 illustrates axle alignment apparatus 10 which embodies the present invention. The apparatus 10 is shown installed beneath a vehicle such as a truck trailer having a frame 11 with a kingpin 12 depending from the frame 11 at the front thereof and an axle housing 13 mounted to the underside of the frame 11 at the rear end thereof. The axle housing 13 is adjustably mounted to the frame 11 by any of several different conventional mounting assemblies, such as the illustrated clamp arrangement 14 which comprises a pair of U-bolts 14a,14a and a cooperating plate 14b which clamps the axle housing 13 to the spring assembly 15.

As best seen in FIG. 2, the axle housing 13 is properly aligned with respect to the trailer frame 11 when the axis of the axle housing 13 is perpendicular to a longitudinal axis B—B extending rearwardly through the kingpin, or reference datum 12, located on the transverse median of the trailer frame 11. When the axle housing 13 is thus disposed, the trailer 11 tracks properly behind its pulling tractor. Over a period of time, the axle 13 can become misaligned with respect to the trailer frame 11. Misalignment is defined as the condition which exists when the axis A—A of the axle 13 is not orthogonal to the axis B—B of the trailer frame 11. The disadvantages of improper axle alignment are well known and need not be discussed herein. It is sufficient to note that minimum tire wear, and maximum fuel economy and braking safety is achieved when the axle 13 is orthogonal to the axis B—B or within a predetermined narrow angular tolerance.

According to the present invention, the apparatus 10 is capable of measuring accurately the magnitude of the axle misalignment so that the axle 13 can be adjusted with precision. Furthermore, the apparatus 10 is designed to enable a mechanic to align the axle expeditiously by eliminating the necessity for his moving back and forth between the axle adjusting mechanism and the alignment indicating apparatus 10, as by enabling him to operate the adjusting turnbuckle 20 connected in a well-known manner between the rear gusset plate 17 and the clamp assembly 14.

The apparatus 10 is easy to install on a trailer frame. For this purpose, the apparatus 10 includes an indicator case 25 and means connecting the case 25 to the axle housing 13. In the present instance, as best seen in FIG. 2, the case connecting means includes a pair of cables 26 and 27 extending rearwardly from the case 25 and having rear ends 26a and 27a hooked onto a pair of flexible clips 28 and 29, respectively, which embrace the axle housing 13 at axially-spaced locations. The cables 26 and 27 converge in a forward direction and have front ends 26b and 27b which are connected on diametrically-opposite sides of the casing 25 on an axis C—C therethrough. The cables 26 and 27 are of equal length, so that the axis C—C through the casing 25 is disposed parallel with the axis A—A of the axle housing 13. The wide divergence of the cables 26 and 27 provided by their connection outwardly on the axle housing 13 as far as possible assists in insuring substantial parallelism between the axis A—A and C—C. Although the clips 28 and 29 are preferably removably mounted on the axle housing 13, if desired, permanent similar structure may be provided for enabling the inner ends 26a and 27a of the cables 26 and 27 to be releasably connected to the axle housing 13. Also, if desired, a suitable fixture may be provided on top of the axle housing 13 to enable the casing 25 to be either releasably or permanently fastened to the axle housing 13.

The casing 25 contains a mechanism which cooperates with readout means carried by the casing to provide a readily visible indication of the alignment of the axle 13. To this end, the casing 25 has a circular peripheral wall 25a which is preferably molded integral with a bottom wall 25b and which mounts a releasable cover or top wall 25c. The front of the side wall 25a has a horizontal slot 25' through which an input lever 33 protrudes. The front end 33a of the input lever 33 is connected to a cable 34 which extends forwardly from the casing 25 and connects to the rear end of an extension spring 35 fastened to the kingpin 12 by means of a collar 36. The extension spring 35 functions to tension the cable 34 and the cables 26 and 27 and thereby to position the case 25 on the longitudinal axis B—B of the trailer frame 11. At the same time, the cable 34 causes the input lever 33 to pivot through an angle corresponding to the angle between the axis A—A of the axle housing 13 and the axis B—B of the trailer frame 11.

Figure 5:
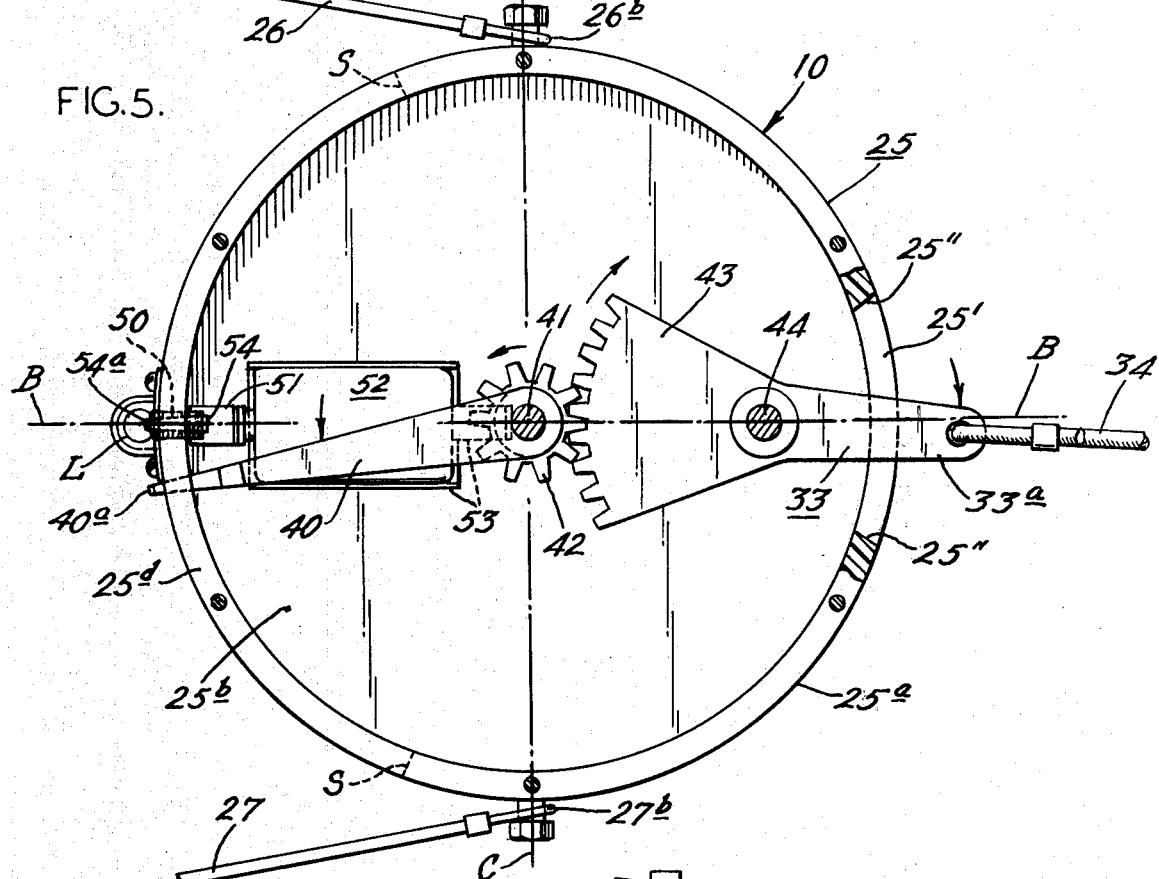
FIG. 5 is a sectional view taken on lines 5—5 of FIG. 3.
Figure 6:
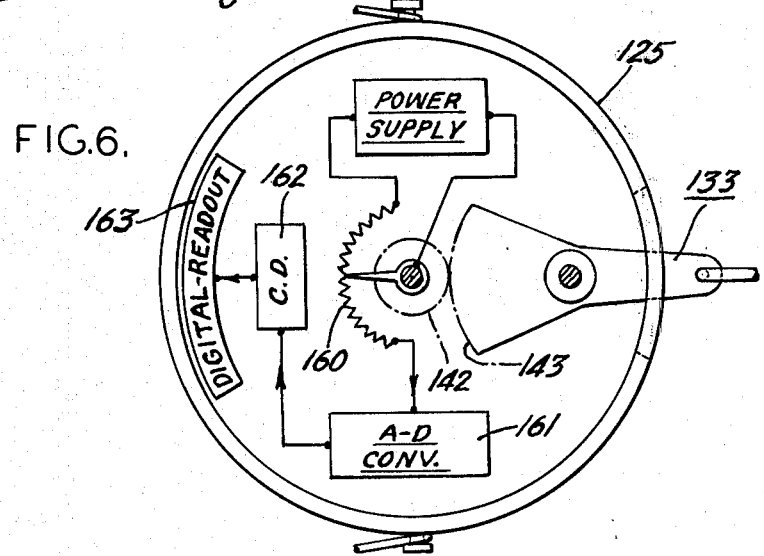
FIG. 6 is a schematic view of a modified embodiment of the present invention providing a digital readout of the angular disposition of the axle.

The casing 25 provides a readout which is indicative of the angular alignment of the axle 13 with respect to the frame 11 but which is readily visible from a location adjacent either rear wheel 21. For this purpose, a rear wall 25d of the casing 25 has an array of graduations, such as the graduations 30, 31 and 32 spaced apart on its outer periphery. Although the graduations may be arranged to correspond with precise degrees of misalignment of the axle housing 13, such arrangement is not necessary in the present invention because the graduations are intended to indicate relative misalignment. It is important, however, for the array to have at least one graduation, such as the graduation 30 with which the pointer tip 40a registers when the axle is properly aligned. The graduations 31-32 are sized sufficiently large as to be capable of being read by a mechanic of normal visual acuity while he operates the adjusting turnbuckle 20. If desired, appropriate illumination may be carried by the casing 25 to increase the visibility of the array 30-32 under conditions of low ambient light. As best seen in FIGS. 3 and 5, a pointer 40 is mounted in the casing 25 for cooperating with the graduations 30-32 to provide the readout. The pointer 40 extends through a slot S in the rear wall 25d of the casing 25 and has a downturned tip 40a located closely adjacent the outside of the rear wall 25d. The pointer 40 has a collar 40b which is fastened to an upstanding shaft 41 rotatably mounted between the bottom and top walls 25b and 25c of the casing 25.

In order to rotate the pointer shaft 41 in response to movement of the input lever 33, a gear train is provided in the casing 25. In the illustrated embodiment, the gear train comprises pinion means 42 secured to the shaft 41 and sector means 43 pivotably mounted to another upstanding shaft 44 and rigidly coupled to the input lever 33, as by being formed integral therewith. Preferably, the pinion and sector means 42 and 43 are gears having meshing teeth of a relatively fine pitch to minimize backlash. The slot 25' in the front wall of the casing 25 has a pair of stops 25",25" which function to engage opposite sides of the input lever 33 to limit pivotal movement of the input lever 33 and thereby to prevent inadvertent disengagement of the sector gear 43 from the pinion gear 42. By virtue of this structure, pivotal movement of the input lever 33 through a relatively small included angle causes the sector gear 43 integral therewith to pivot the pinion gear 42 through a greater included angle and thereby to move the tip 40a of the pointer 40 relative to the graduations corresponding to the relative misalignment angle of the axle. If desired, the gear train may include one or more additional meshing gears connected between the sector gear 43 and the pinion 42 to provide greater amplification of the movement of the pointer in response to pivotal movement of the input lever.

Referring now to FIG. 5, it may be seen that the pivot axis of the pointer and pinion shaft 41 is located on the axis C—C through the casing 25, and the pivot axis of the sector gear shaft 44 is located on a line orthogonal to the axis C—C. The pitch diameter of the sector gear 43 is substantially greater than the pitch diameter of the pinion 42, by a magnitude of about 4/1. Moreover, the length of the pointer 40 is preferably greater than the pitch radius of the sector 43. By virtue of this structure, the angular disposition of the axle 13 relative to the trailer frame 11 is amplified by the mechanism in the casing 25 to provide a readily visible readout.

As an adjunct to the display provided by the pointer and graduations, the casing 10 may be provided with signal producing means operable to provide a sensible readout of axle alignment, such as an illuminated output or an audible signal when the axle alignment is within a predetermined tolerance limit. In the present instance, the signal producing means includes a lamp and socket assembly 50 mounted in the rear wall 25b of the case 25. The lamp and socket assembly 50 has a contact connected to one pole of a battery 52 mounted in the casing 25. The other pole of the battery 52 is connected by a flexible contact 53 to the shaft 41. The lamp and socket assembly 50 has an upstanding flexible contact member 54 with a rearwardly turned tip 54a adapted to engage the depending tip 40a of the pointer 40 when it is in substantial alignment with the axis B—B. When thus engaged, current flows through the contact 51, the lamp L and socket assembly 50 through the contact 54 and pointer 40 to the pointer shaft 41 and contact 53 to the battery 52 thereby causing the lamp L to light. The width of the downwardly-tapered pointer tip determines the point at which the lamp L lights. Hence, by varying the width of the tip, the angular tolerance range over which the lamp L is illuminated can be predetermined. The pointer tip 40a and contact member 54 are sufficiently flexible as to enable them to deflect relative to one another to enable the tip 40a of the pointer to move along the outer periphery of the casing 25. This structure provides the additional advantage of providing an automatic indication of proper axle alignment while enabling the apparatus 10 to be used effectively under conditions of low ambient lighting.

In another embodiment, the readout may be either a digital display of the alignment or a sensible signal such as a light or sound signal when the axle is properly aligned. To this end, a casing 125 is provided with an input lever 133 connected to a sector gear 143 operable to pivot a pinion gear 142. The pinion gear 142 is connected to a rotary resistor or potentiometer 160 operable in response to rotation of the pinion gear 142 to provide a variable resistance. The potentiometer 160 is connected in a circuit to a power supply for producing an analog voltage signal in response to rotation of the pinion gear 142. The analog voltage signal so produced is supplied to an analog to digital converter 161. The analog to digital converter 161 converts the signal to a form suitable for processing in the code-decode module 162 which is coupled to an illuminated readout 163 which provides a digital or numerical indication of axle misalignment. Thus, pivotal movement of the input lever 133 an amount corresponding to the actual amount of axle misalignment causes the resistance of the potentiometer 160 to vary and thereby to provide a variable voltage or current output which is processed in an electrical circuit composed of conventional signal processing modules to provide a readily visible illuminated digital display. If desired, the input lever 133 may be connected directly to the shaft of the potentiometer 142; however, in such event, appropriate compensation may be required in the circuit to ensure sufficient sensitivity between angular motion of the potentiometer shaft 160 and the readout.

A further modified embodiment of the present invention illustrated in FIGS. 7-10 affords certain advantages not present in the aforementioned embodiments. For instance, in this embodiment, the casing mounts directly onto the axle so that cables for connecting the casing to the vehicle axle are not needed. For this purpose, the axle 213 has a pair of drilled and tapped holes 213a and 213b at spaced locations for receiving bolts 214 and 215 which pass through L-shaped brackets 216 and 217, respectively. The casing 225 is pivotally mounted to the brackets 216 and 217 by means of an elongated bar 218 which underlies the casing 225 and has a pair of upturned ends 218a and 218b which are pivotally connected to the brackets 216 and 217 by means of bolts 220 and 221, respectively. Preferably, the bolt holes 213a and 213b are provided at equally spaced distances from the longitudinal median thereof. Preferably, the bolt holes 213a and 213b are located in the bottom of the axle 213 so that sufficient clearance is available for the casing 225 and cable 234. In situations where clearance is not a problem, the casing 225 can be mounted to the top of the axle 213. With this structure, the casing 225 can be easily bolted to and unbolted from the axle 213, and since the bolt holes 213a and 213b are predrilled at the factory, they can be accurately located relative to the longitudinal axis of the axle 213 so that accurate alignment can be obtained.

As in the preceding embodiments, the casing 225 mounts an input lever 233 which is connected to a cable 234 extending forwardly to a reference point on the vehicle such as the kingpin 36 illustrated in FIG. 1. The input lever has a sector gear 243 which engages a pinion gear 242 to rotate a shaft 241 for turning a pointer 240. Unlike the embodiment of FIGS. 1-5, where the angular misalignment is designed to be read only from the rear of the case 25, in this embodiment, the alignment can be read from either the front or the rear. For this purpose, a rear pointer 240 is mounted to the pointer shaft 241 by the collar 240b, and a front pointer 280 is similarly mounted to the pointer shaft 241. As best seen in FIG. 10, the pointer 280 has an enlarged arcuate portion 281 with an arcuate slot 282 therein and a depending tip 280a located closely adjacent the outside of the front wall 225a of the casing 225 to register with an array of graduations 230-232 thereon. The arcuate slot 282 in the pointer 280 enables it to pivot relative to the sector and input lever shaft 244. The ends 282a and 282b of the slot can, however, engage the shaft 244 to limit the pivotal movement of the pointer 280 and hence the pinion 242 and the sector 243. If desired, the rear pointer 240 can be eliminated if rear reading capability is not needed.

This embodiment has several advantages not present in the previously-mentioned embodiments. For instance, the pre-drilled holes in the top of the axle 213 provide an accurate mounting of the casing 225 to the axle 213 while eliminating the need for the cables 26 and 27. In addition, a mechanic can read the angular misalignment of the axle 213 directly from the front of the casing 225 while making adjustments at the front of the axle 213. Although an illuminated signal is not provided in this embodiment to indicate correct alignment, such can be provided in this embodiment by modifying the apparatus along the lines illustrated in the embodiment of FIGS. 1-5. Of course, if insufficient ambient light is available to enable the location of the pointer tip to be seen, the mechanic can simply use a flashlight.

While preferred embodiments of the present invention have been described in detail, various modifications, alterations and changes may be made without departing from the spirit and scope of the present invention as defined in the appended claims.

I claim:

1. Apparatus useful in aligning the axle of a vehicle with respect to its frame, said apparatus including a case, a pair of cables of equal length having inner ends connected to said axle at spaced locations and having outer ends connected to said case at spaced locations closer together than said axle connections so that said cables converge in a forward direction from said axle, an input lever carried by said case to pivot about an upright axis, and means for connecting said input lever to a reference datum on the frame to cause said lever to pivot relative to the case into an angle corresponding to the alignment angle of the axle, gearing means coupled to said input lever, said gearing means including a sector gear connected to said input lever and a pinion gear of smaller pitch diameter meshing with said sector gear, and readout means coupled to said case and responsive to rotation of said gearing means to produce a readout corresponding to the angular disposition of said axle with respect to the frame, said readout means including an array of graduations carried on said case and a pointer coupled to said pinion and extending into registry with said array, said graduations being disposed on said case on the side thereof opposite said input lever, and said pointer being adapted to register with said graduations upon pivotal movement of said input lever, whereby the readout may be seen readily by a mechanic located remote from the apparatus.

2. Apparatus useful in aligning the axle of a vehicle with respect to its frame, said apparatus including a case, means for connecting said case to the axle, including a bracket disposed transversely to an input lever, pre-located means on said axle adjacent its median for disposing said bracket parallel to said axle and midway between the ends thereof, and means for fastening said bracket to said pre-located means, said input lever carried by said case to pivot about an upright axis, and means for connecting said input lever to a reference datum on the frame to cause said lever to pivot relative to the case into an angle corresponding to the alignment angle of the axle, gearing means coupled to said input lever for rotating in response to pivotal movement of said input lever, said gearing means including a sector gear connected to said input lever and a pinion gear of smaller pitch diameter meshing with said sector gear, and readout means coupled to said case and responsive to rotation of said gearing means to produce a readout corresponding to the angular disposition of said axle with respect to the frame, said readout means including an array of graduations carried on said case and a pointer coupled to said pinion and extending into registry with said array, said graduations being disposed on said case on the side thereof adjacent said input lever, and said pointer having an elongated arcuate slot affording movement thereof relative to the pivot axis of said lever in response to pivotal movement of said pinion gear upon angular displacement of said sector gear, whereby the readout may be seen readily by a mechanic located remote from the apparatus.

* * * * *